(12) United States Patent
Porte et al.

(10) Patent No.: US 9,315,275 B2
(45) Date of Patent: Apr. 19, 2016

(54) FASTENING DEVICE PARTICULARLY SUITABLE FOR THE FASTENING BETWEEN AN AIR INTAKE AND AN ENGINE OF AN AIRCRAFT NACELLE

(75) Inventors: Alain Porte, Colomiers (FR); David Lambert, Cugnaux (FR); Franck Le Flem, Leguevin (FR)

(73) Assignee: Airbus Operations SAS (FR)

( * ) Notice: Subject to any disclaimer, the term of this patent is extended or adjusted under 35 U.S.C. 154(b) by 899 days.

(21) Appl. No.: 13/563,858

(22) Filed: Aug. 1, 2012

(65) Prior Publication Data

US 2013/0034437 A1 Feb. 7, 2013

(30) Foreign Application Priority Data

Aug. 5, 2011 (FR) .................................. 11 57203

(51) Int. Cl.
*F02C 7/04* (2006.01)
*B64D 33/02* (2006.01)

(52) U.S. Cl.
CPC . *B64D 33/02* (2013.01); *F02C 7/04* (2013.01); *B64D 2033/0206* (2013.01); *B64D 2033/0286* (2013.01); *F05D 2240/14* (2013.01); *Y02T 50/672* (2013.01)

(58) Field of Classification Search
CPC ............. F02C 7/04; F02C 7/05; B64D 33/02; B64D 33/022; B64D 2033/0266; B64D 2033/0273; B64D 2033/0286; B64D 2033/0293; B64D 2033/0206; B64D 27/26; F05D 2240/14
USPC ...... 415/9, 213.1, 214.1; 244/53 R, 53 B, 54; 403/335–338
See application file for complete search history.

(56) References Cited

U.S. PATENT DOCUMENTS

| 2004/0033133 A1* | 2/2004 | Muny ............................ 415/175 |
| 2004/0101384 A1 | 5/2004 | Schilling et al. |
| 2005/0053419 A1* | 3/2005 | McMillan et al. ................ 403/2 |
| 2005/0252195 A1* | 11/2005 | Porte et al. ................... 60/226.1 |

(Continued)

FOREIGN PATENT DOCUMENTS

| EP | 1357279 A2 | 10/2003 |
| EP | 1591643 A1 | 11/2005 |

(Continued)

OTHER PUBLICATIONS

French Preliminary Search Report for Application No. FR1157203 dated Apr. 12, 2012.

*Primary Examiner* — Christopher Verdier
(74) *Attorney, Agent, or Firm* — Lerner, David, Littenberg, Krumholz & Mentlik, LLP

(57) ABSTRACT

An aircraft nacelle includes a first conduit for an air inlet and a second conduit for an engine, arranged end to end and connected by an annular flange, attached to the air inlet, and an annular flange, attached to the engine. The annular flanges are connected by a plurality of passage holes in the annular flanges and arranged in line with each other. Rods are housed in the passage holes. For at least one rod, the passage hole of one of the annular flanges has a diameter greater than the diameter of the rod allowing the rod to move in case of deformation of one of the two conduits. An angle profile is inserted between the rod and a cylindrical portion adjacent to the annular flange and is connected to the adjacent cylindrical portion through the intermediary of at least one mechanism for absorbing eventual deformations in radial direction.

9 Claims, 4 Drawing Sheets

(56) References Cited

U.S. PATENT DOCUMENTS

Figure 4A:
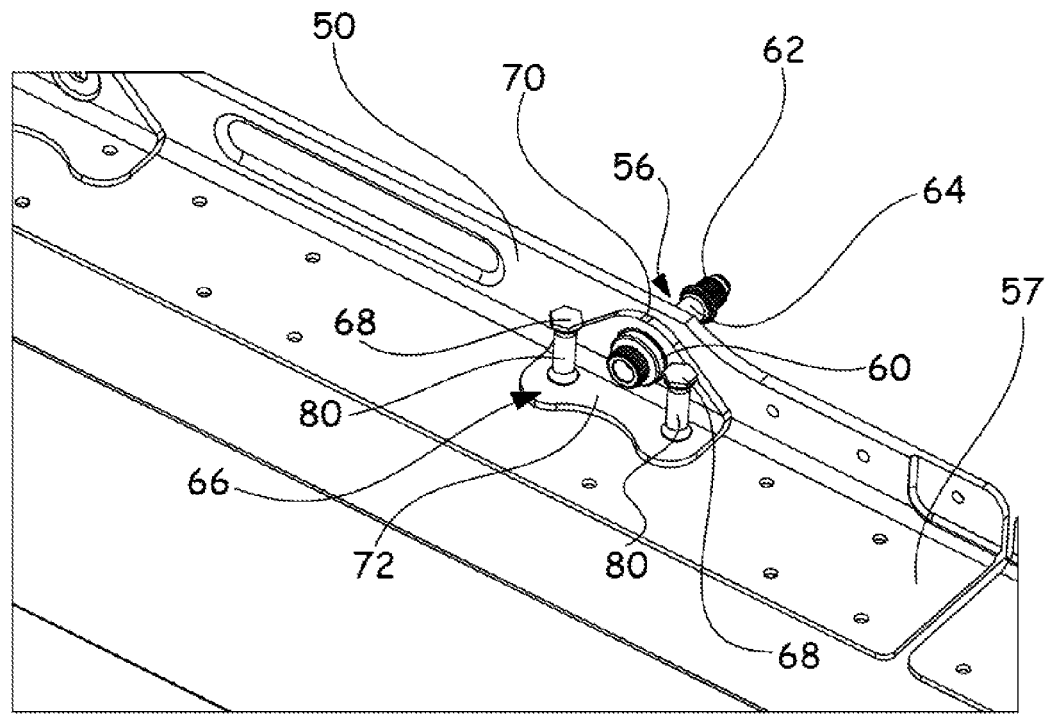

2010/0000227 A1* 1/2010 Porte et al. .................. 60/796
2011/0168839 A1* 7/2011 Porte et al. .................. 244/1 N

FOREIGN PATENT DOCUMENTS

| FR | 2936223 A1 | 3/2010 | |
| WO | WO-2008/006959 A1 * | 1/2008 | ............... F02C 7/04 |

* cited by examiner

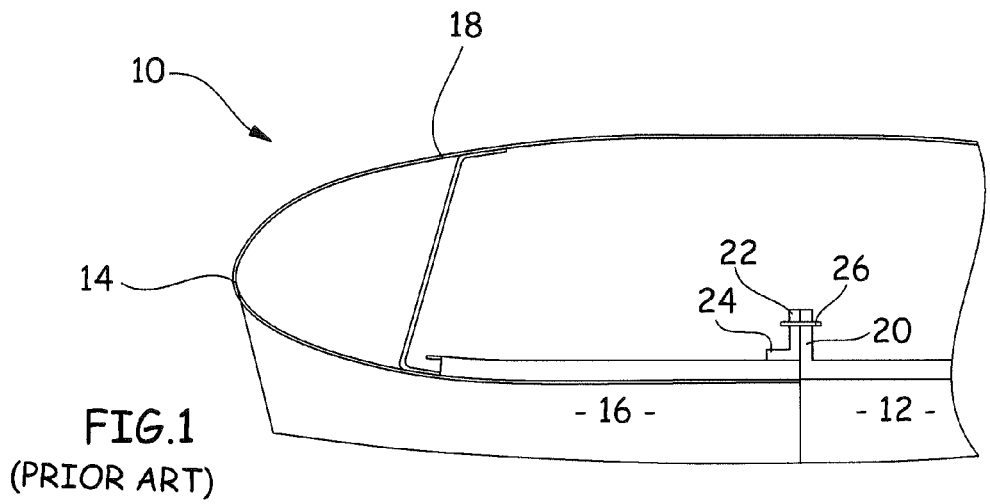
FIG.1 (PRIOR ART)
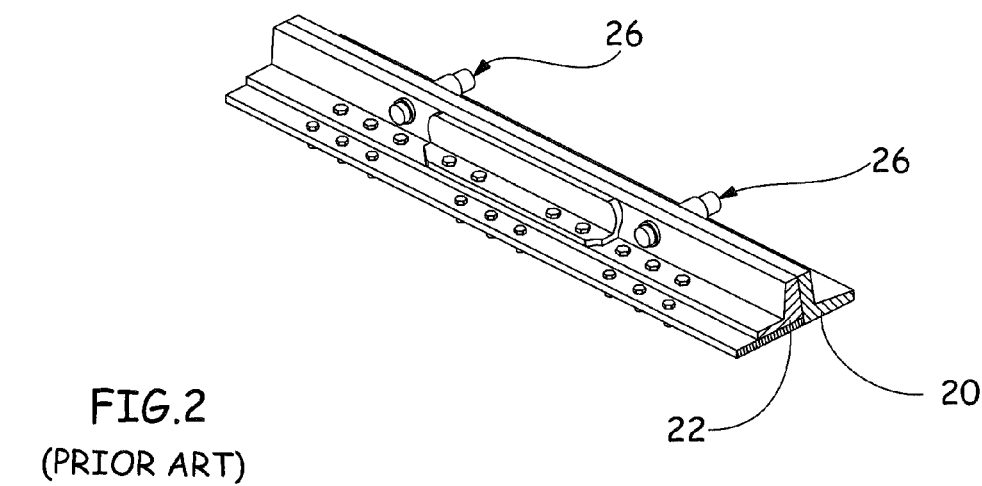
FIG.2 (PRIOR ART)
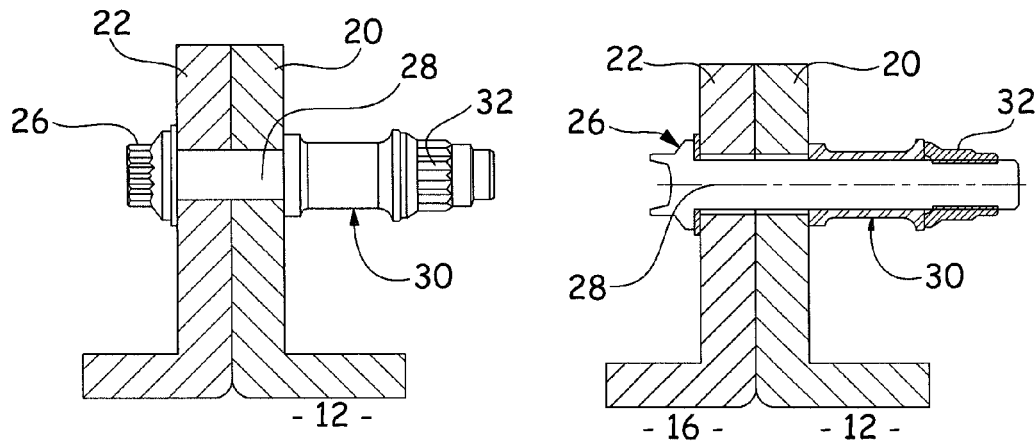
FIG.3A (PRIOR ART)
FIG.3B (PRIOR ART)

FASTENING DEVICE PARTICULARLY SUITABLE FOR THE FASTENING BETWEEN AN AIR INTAKE AND AN ENGINE OF AN AIRCRAFT NACELLE

The present invention relates to an aircraft nacelle integrating a fastening device ensuring the connection between an air inlet and an engine, while limiting the propagation of deformations between the two assembled elements, specifically in radial direction.

An aircraft propulsion assembly comprises a nacelle in which an engine is installed in concentric manner and connected through the intermediary of a post to the rest of the aircraft.

As illustrated in FIG. 1, the nacelle comprises in front an air inlet 10 channeling the air flow in the direction of engine 12.

The air inlet has a lip 14 with a surface which is in contact with the aerodynamic flow, and is extended inside the nacelle by an internal conduit 16 and on the outside of the nacelle by an exterior wall 18.

The air inlet 10 is connected with the engine 12 by a fastening device illustrated in detail in FIGS. 2, 3A and 3B. This fastening device comprises at the engine a first annular flange 20 attached to a second annular flange 22 of a panel delimiting conduit 16 or an intermediate part 24, called flange, connected to the panel delimiting the conduit 16, as illustrated in FIG. 2, The two flanges 20 and 22 are located against each other and held in this position by fastening elements 26, for instance bolts or rivets, passing through flanges 20, 22 and extending parallel to the longitudinal axis of the nacelle.

According to an implementation mode illustrated in FIG. 3A, the bolts or rivets 26 comprise a rod 28 with a diameter which can be adapted to the passage holes made in the annular flanges 20 and 22.

According to a second implementation mode illustrated in FIG. 3B, the diameter of the passage holes made in annular flanges 20 and 22 can be slightly larger than the diameter of rod 28 of bolts or rivets 26. This play of approximately 1 mm between the passage holes and the bolts or rivets 26 allows for relative movement between the two connected elements.

In both cases the passage holes are cylindrical.

The fastening device and more particularly the bolts or rivets 26 are dimensioned to mitigate any risk of incidents, such as for instance breakage of a blower blade.

In this case, the engine conduit can deform over its whole periphery or part of it. During these deformations, the passage holes of the annular flange of the engine are no longer located in line with the air inlet holes. In this configuration, the bolts or rivets 26 are subjected to relatively high shear stresses, which are distinctly higher than the stresses under normal operating conditions. Even if the second implementation mode allows for relative movement between the two connected parts, due to the clearance around the bolts or rivets 26, this play is markedly smaller than the relative movement between the two connected parts in case of an incident such as breakage of a blade. In the case of the second implementation mode with play, it is observed that the shear stresses are at least equal to the stresses occurring for the first implementation mode, or even greater.

To withstand these stresses, the fastening device comprises a specific number of bolts or rivets 26 of specific diameter.

Taking into account the strength of a bolt or rivet 26 in an assembly according to the implementation modes illustrated in FIGS. 3A and 3B, a fastening device must be provided with a large number of bolts or rivets 26 and/or with bolts or rivets 26 of large diameter, which results in higher embarked mass and consequently higher energy consumption of the aircraft.

Another problem is that the deformations of the motorization conduit have a tendency to propagate in the direction of air inlet conduit 16. Consequently, it is necessary to take into account these possible deformations during the design of the air inlet conduit 16 which is made, in general, of composite material and integrates an acoustic treatment system.

To limit the propagation of deformations from annular flange 20 of the engine towards flange 22 of the air inlet, a filter can be installed at the location of the fastening elements 26. For each connection device, this filter comprises at least one deformable bushing 30 slipped over rod 28 of fastening element 26. According to the example illustrated in FIG. 3A, the deformable bushing 30 is inserted between the annular flange 20 attached to the engine and a nut 32 of fastening element 26. This deformable bushing 30 has an inside diameter adapted to the diameter of rod 28 and its central part has a relatively thin wall thickness so that is can deform, particularly through buckling. This arrangement increases the energy absorbed by the fastening device through deformation. It also limits the propagation of deformations in axial direction.

However, in case of blade breakage, the most important deformations are oriented in radial direction. In this direction, the effects of the deformable bushing 30 are limited.

The present invention is proposing a fastening device more particularly suited for connecting an engine and an air inlet of an aircraft nacelle, which limits the propagation of deformations between the two assembled elements, specifically in radial direction.

To this end, the goal of the invention is an aircraft nacelle comprising a first air inlet conduit and a second engine conduit, whereby the two conduits are arranged end to end and connected by a fastening device comprising an annular flange attached to the air inlet and an annular flange attached to the engine and located against said annular flange of the air inlet, said annular flanges are connected by means of a plurality of passage holes, made in the annular flanges and located in line with each other, and first fastening elements of which the rods are housed in the passage holes, characterized in that, for at least one fastening element, the passage hole of one of the annular flanges has a diameter markedly greater than the diameter of the rod, allowing for movement of said rod in case of deformation of one of the two conduits, and in that an angle profile is inserted between the first fastening element and a cylindrical part adjacent to said annular flange, said angle profile is connected to the adjacent cylindrical portion through the intermediary of at least one second fastening element comprising a means for absorbing eventual deformations in radial direction.

Figure 5A:
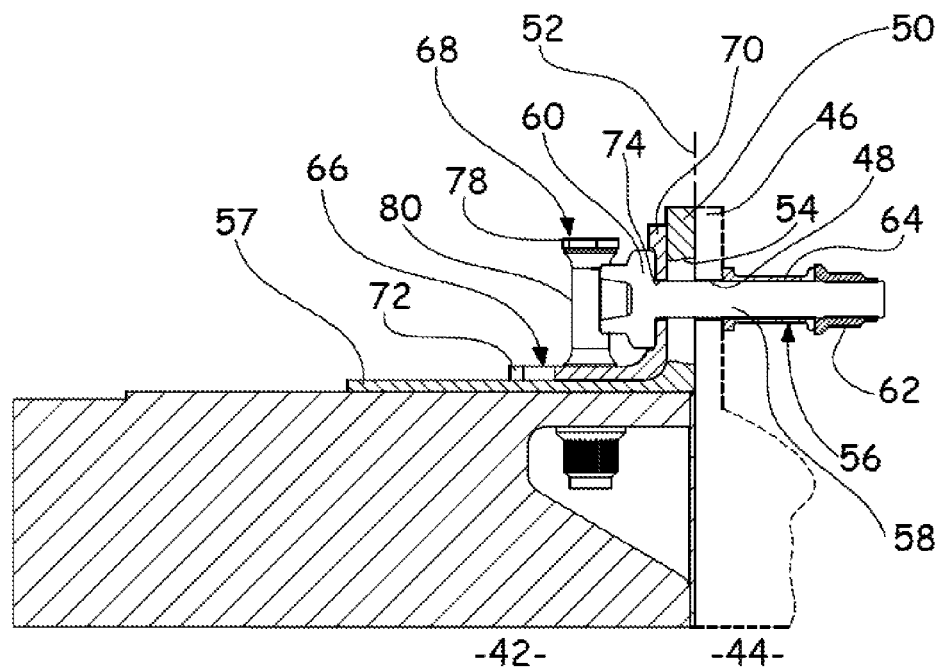
Figure 6B:
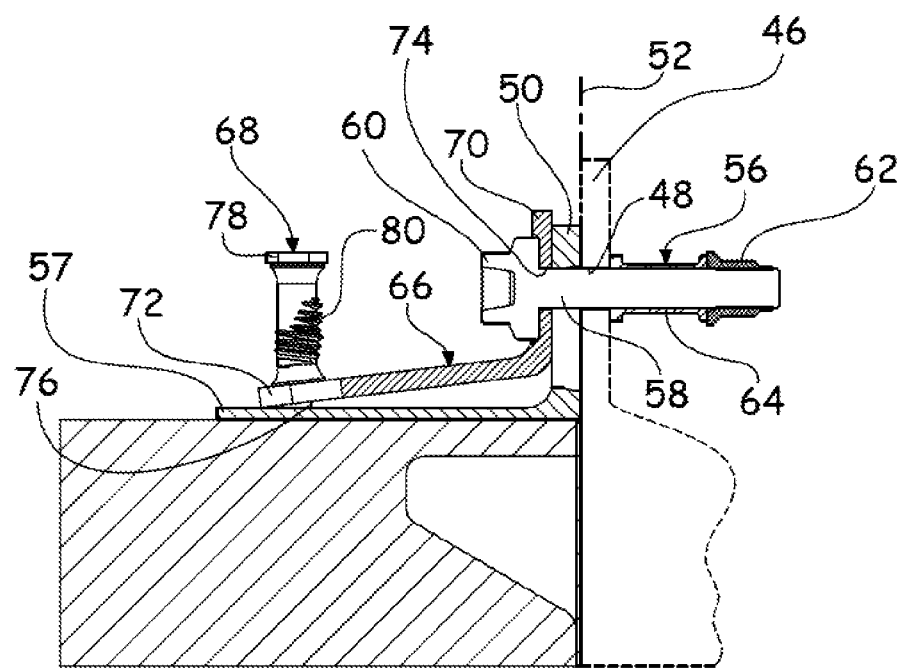
Figure 4B:
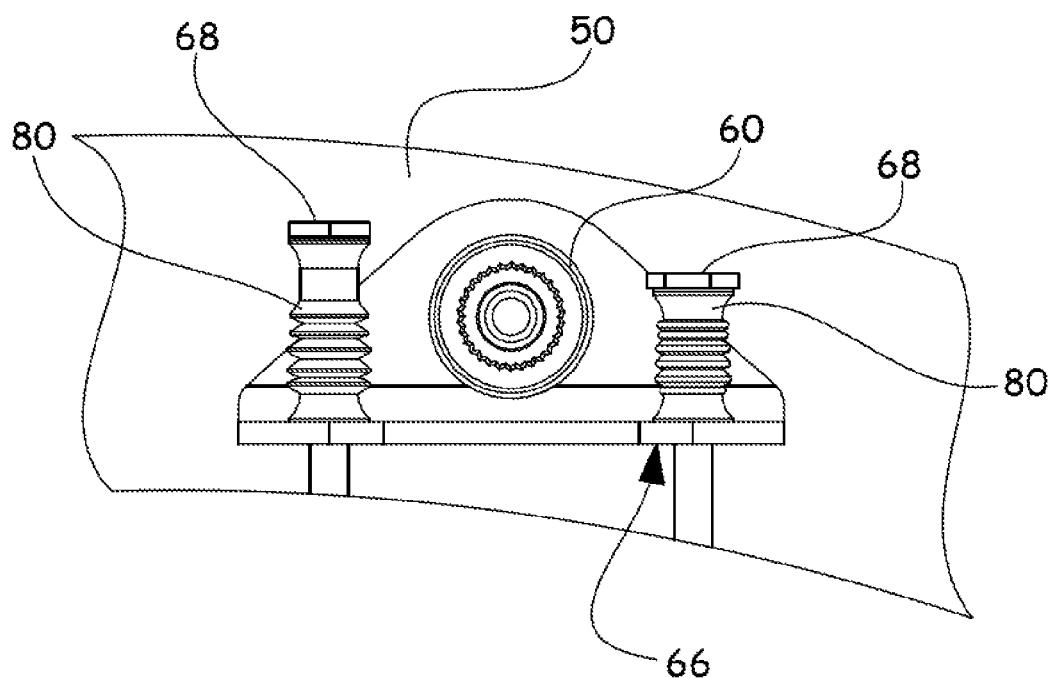
Figure 5B:
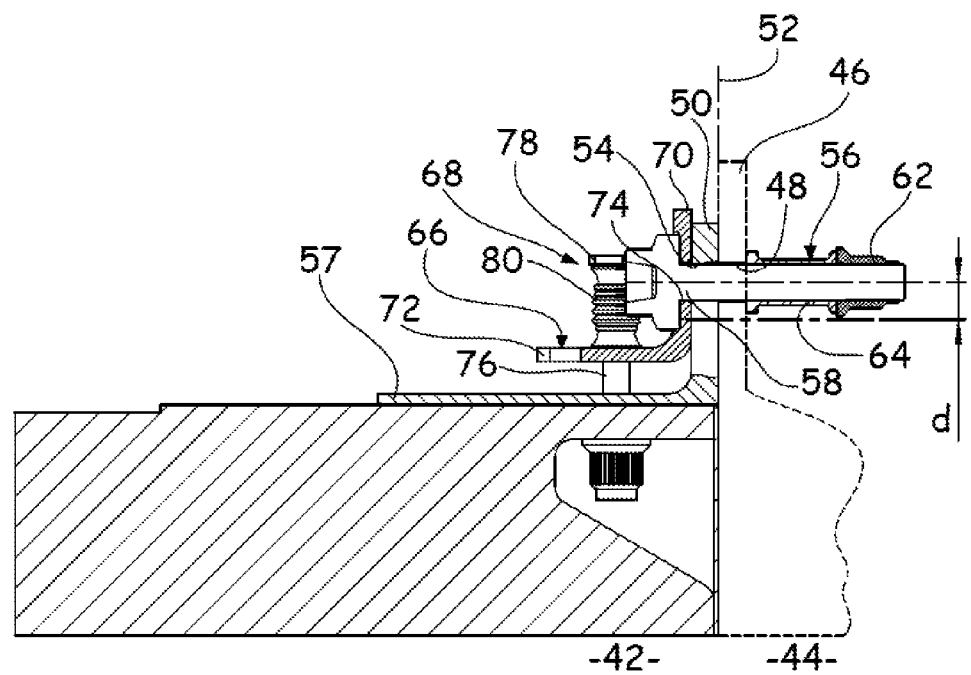
Figure 6A:
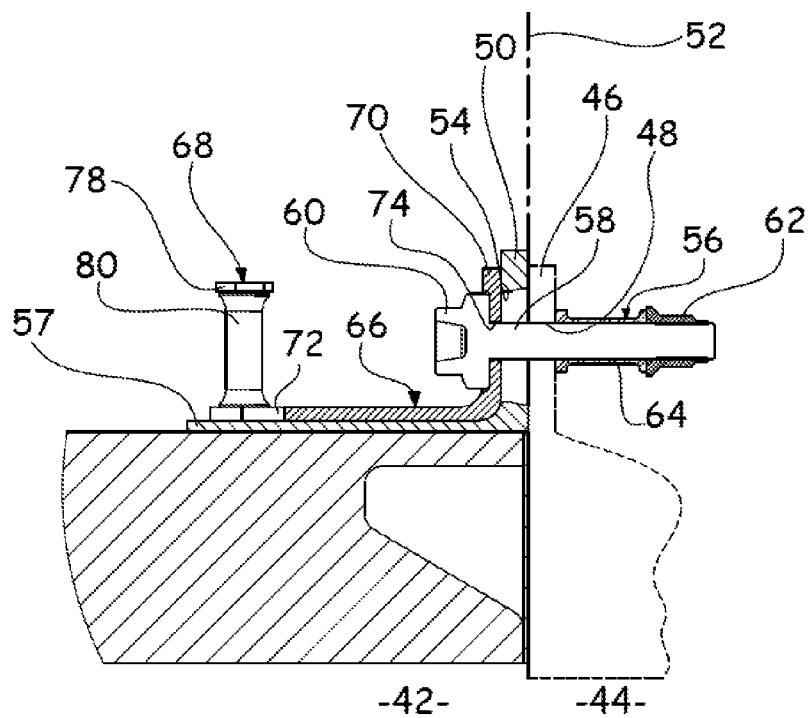

Other characteristics and advantages will become clear from the following description of the invention, which is given only as an example, with respect to the attached drawings in which:

FIG. 1 is a schematic cross section along a radial plane of the front part of an aircraft nacelle, FIG. 2 is a view in perspective illustrating a portion of a connection between engine and air inlet of an aircraft nacelle according to prior art, FIG. 3A is a cross section illustrating a fastening element between engine and air inlet of an aircraft nacelle according to a first implementation mode of prior art, FIG. 3B is a cross section illustrating a fastening element between engine and air inlet of an aircraft nacelle according to another implementation mode of prior art, FIG. 4a is a view in perspective of a portion of a connection between engine and air inlet of an aircraft nacelle according to the invention, FIG. 4B is a lateral view of the connection portion visible in FIG. 4A after deformation, FIG. 5A is a cross section of a connection between engine and air inlet of an aircraft nacelle according to a variant of the invention, FIG. 5B is a cross section of the connection illustrated in FIG. 5A after deformation, FIG. 6A is a cross section of a connection between engine and air inlet of an aircraft nacelle according to another variant of the invention, and FIG. 6B is a cross section of the connection illustrated in FIG. 6A after deformation.

FIGS. 5A, 5B, 6A and 6B show a cross section of the joint zone between a first air inlet conduit 42 and a second engine conduit 44 of an aircraft nacelle, which are arranged end to end. The section plane contains the longitudinal axis of the nacelle and the axis of a fastening element.

According to one implementation mode, the fastening device between the engine and the air inlet comprises on the engine side, an annular flange 46 extending in a plane perpendicular to the longitudinal axis of the nacelle and comprising a plurality of passage holes 48, on the air inlet side, an annular flange 50 extending in a plane perpendicular to the longitudinal axis of the nacelle, and locating against the annular flange 46 of the engine at the joint plane with reference 52 and comprising a plurality of passage holes 54, arranged in line with passage holes 48 of the engine, and fastening elements 56 distributed over the periphery of the annular flanges 46 and 50 and housed in the passage holes 48 and 54.

In all cases, each annular flange 46, 50 is solidly attached to an adjacent cylindrical portion 57.

According to one implementation mode, the annular flange can be made in a single piece with the engine or air inlet. In variant, the annular flange can be an independent piece, assembled to the engine or air inlet.

According to another implementation mode, the annular flange 50, solidly attached to the air inlet, is made in a single piece with a cylinder portion so as to form a flange with L section in a longitudinal plane, as illustrated in FIG. 4A. In the same manner, the annular flange 50 can extend as a single piece along the whole circumference or can consist of several angular sectors as illustrated in FIG. 4A.

Each connection element 56 comprises a rod 58 in the form of a cylinder within a first extremity a first shoulder 60 locating against the free face of one of the flanges, in this case the annular flange 50 of the air inlet, and in the other extremity a second shoulder 62 locating against the free face of the other flange, in this case the annular flange 46 of the motorization.

According to one implementation mode, a fastening element 56 can have the form of a bolt, with on one side a screw consisting of a rod with a head in a first extremity (corresponding to the first shoulder 60) and a thread in the other extremity, and on the other side a nut (corresponding to the second shoulder 62) which is screwed on the threaded extremity.

In variant, the fastening element can have the form of a rivet with a rod comprising in a first extremity a head forming the first shoulder and a second shoulder in the second extremity obtained by deformation of the second extremity.

Advantageously, the fastening element 56 comprises a deformable bushing 64 which can be slipped over rod 58 and interposed between one of the flanges and one of the shoulders. According to the illustrated example, the deformable bushing 64 is inserted between the annular flange 46 of the engine and shoulder 62 consisting of a nut of the fastening element, This deformable bushing 64 has an inside diameter adapted to the diameter of rod 58 and comprises in the central part a relatively thin wall thickness so that it can deform, particularly through buckling. The arrangement increases the energy absorbed by deformation of the fastening device and limits the propagation of deformations oriented in axial direction.

The invention is proposing a fastening device that absorbs through plastic and elastic deformation a portion of the energy produced by the impact of a blade fragment against the engine conduit and is limiting the propagation of deformations, more particularly the radial deformations, between the engine conduit and the air inlet conduit.

The specific arrangement of the invention is described as applied to the annular flange 50 solidly attached to the air inlet. It can be applied also to the annular flange 46 solidly attached to the engine.

Although it is described for one fastening element, it applies at least to one fastening element 56 and by preference to all fastening elements 56.

According to the invention, the passage hole 48 of the annular flange 46, solidly attached to the engine, has a diameter adapted to the diameter of rod 58 of fastening element 56. In this way, the relative movement between the fastening element 56 and the annular flange 46 is almost zero. By "adapted" we mean that the clearance between the passage hole 48 and the rod is smaller than or equal to 2 mm.

In parallel, the diameter of passage hole 54 in the annular flange 50 is distinctly greater than the diameter of rod 58 so as to allow for a displacement of said rod 58 greater than or equal to 5 mm.

Advantageously, the axis of passage hole 54 is offset towards the exterior relative to the axis of the passage hole 48 in order to obtain the longest travel, knowing that rod 60 will move radially towards the exterior in case of blade breakage. In the absence of deformation, as illustrated in FIGS. 5A and 6A, the portion of the circumference of passage hole 54 closest to the longitudinal axis of the nacelle is at the same height as the corresponding portion of the circumference of passage hole 48, while the portion of the circumference of passage hole 54 the farthest away from the longitudinal axis of the nacelle is offset towards the exterior relative to the corresponding portion of the circumference of passage hole 48.

According to the invention, an angle profile 66 is inserted between the fastening element 56 and the cylindrical portion 57 adjacent to the annular flange 50, said angle profile 66 is connected to the adjacent cylindrical portion 57 through the intermediary of at least one fastening element 68, suitable for absorbing eventual deformations in radial direction.

According to one implementation mode, the angle profile 66 has an L section in a longitudinal plane and comprises a first wing 70 located against the annular flange 50 and another wing 72 located against the adjacent cylindrical portion 57, which corresponds in this case to a tubular part with a flange.

The first wing 70 comprises a passage hole 74 with a diameter adapted to the diameter of rod 58 of fastening element 56. In this way, the relative movement between the fastening element 56 and the angle profile 66 is almost zero.

The second wing 72 is connected to the adjacent cylindrical portion 57 through the intermediary of at least one fastening element 68. Advantageously, two identical fastening elements 68 can be provided for connecting the angle profile 66 to the adjacent cylindrical portion 57 as illustrated in FIG. 4A.

When a blade breaks, the connection may be subjected to stresses that are not purely radial and can have a component in tangential direction due to the rotational speed of the blades. The arrangement with two fastening elements 68 absorbs also eventual deformations in tangential direction thanks to dissymmetric deformation of the fastening elements 68 as illustrated in FIG. 4B.

In the presence of two fastening elements 68, the angle profile 66 has a triangular shape with rounded tops when it is unfolded and flattened.

According to one implementation mode, the connection element 68 comprises a rod 76, with axis oriented in radial direction, fixed relative to the air inlet and the annular flange 50 within its upper extremity a shoulder 78 in the form, for instance, of a screw head or a nut.

The second wing 72 comprises a passage hole for rod 76 with a hole diameter which may or may not be adapted to the diameter of rod 76.

According to one important point of the invention, a deformable element 80 is inserted between the shoulder 78 and the second wing 72 of the angle profile.

According to one implementation mode, the deformable element 80 can be a deformable bushing functioning in the same manner as deformable bushing 64.

In case of blade breakage, the engine conduit has a tendency to deform in radial direction. This radial deformation provokes a radial movement towards the exterior of the fastening element 56. Since the diameter of passage hole 74 of angle profile 66 is adapted to the diameter of the rod of fastening element 56, the angle profile 66 follows the radial movement towards the exterior of fastening element 56.

Taking into account the large diameter of passage hole 54 in the annular flange 50, the radial movement towards the exterior of the fastening element 56 is not transmitted to the flange 50 and therefore is not transmitted to the air inlet.

As illustrated in FIGS. 5B and 6B, while deforming, deformable element 80 absorbs a portion of the energy, which tends to limit the movement of rod 58 of fastening element 56 so that in this way it is not subjected to shear stresses by coming in contact with the wall of passage hole 54.

With this arrangement, the propagation of radial deformations towards the air inlet is limited.

The invention is not limited to the deformable bushing as illustrated in the figures. For instance, the deformable element could consist of a compression spring.

According to the invention, the deformable element 80 will generate a force with a tendency of opposing the radial movement towards the exterior of the angle profile and therefore of fastening element 56. This force is proportional to the radial displacement A of the fastening element.

When the deformable element is a deformable bushing as illustrated in FIGS. 5A, 5B, 6A and 6B, the bushing height is inversely proportional to the distance separating fastening element 68 from the first wing 70 of angle profile 66. In fact, when fastening element 68 is located at a distance from the first wing 70 as illustrated in FIGS. 6A and 6B, the angle profile 66, when deforming, more particularly when deforming by unfolding, can absorb a portion of the deformation energy and limit the radial movement of fastening element 56 as illustrated in FIG. 6B. In this case, deformable element 80 is subjected to a deformation which is smaller than the deformation to which this same element would be subjected in the configurations of FIGS. 5A and 5B, so that the height of the deformable element 80 can be smaller than the height of the same element in the configurations of FIGS. 5A and 5B.

As an example, when the distance separating fastening element 68 and the first wing 70 of the angle profile varies from 5 to 15 mm, the deformable element must have a height allowing for a travel of 10 mm.

The invention claimed is:

1. An aircraft nacelle comprising:
a first conduit for an air inlet;
a second conduit for an engine; and
a fastening device;
wherein the first and second conduits are arranged end to end and connected by the fastening device;
wherein the fastening device comprises:
a first annular flange attached to the air inlet;
a second annular flange attached to the engine;
wherein, said first and second annular flanges comprise a first and a second pluralities of passage holes, defined in the annular flanges and arranged in line with each other, and
first fastening elements comprising a plurality of rods housed in the passage holes,
wherein, for at least one first fastening element, the passage hole of one of the first and second annular flanges has a diameter greater than the diameter of one of the plurality of rods, allowing said one rod to move in case of deformation of one of the first and second conduits and the passage hole of the other of the first and second annular flanges has a diameter adapted to the diameter of the one rod,
wherein an angle profile is inserted between the first fastening element and a cylindrical portion adjacent to said first annular flange,
wherein said angle profile is connected to the adjacent cylindrical portion through the intermediary of at least one second fastening element comprising a means for absorbing eventual deformations in a radial direction,
wherein the second fastening element further comprises a deformable element inserted entirely between the angle profile and a shoulder solidly attached to said second fastening element.

2. The nacelle according to claim 1, wherein the greater diameter of the passage hole is configured to allow said one rod a displacement greater than or equal to 5 mm.

3. The nacelle according to claim 1, wherein the axis of the passage hole of the annular flange with an enlarged diameter is offset towards the exterior relative to the axis of the passage hole of the other annular flange.

4. The nacelle according to claim 1, wherein the second fastening element comprises a rod with axis oriented in the radial direction.

5. The nacelle according to claim 1, wherein the angle profile comprises a passage hole adapted to the diameter of the one rod of the first fastening element.

6. The nacelle according to claim 5, wherein the deformable element is configured to generate a force on the angle profile with a tendency to oppose the radial movement towards the exterior of said angle profile, whereby said force is proportional to the displacement of the first fastening element.

7. The nacelle according to claim 6, wherein the deformable element is a deformable bushing with a relatively thin wall thickness in a central part so that the bushing can deform.

8. The nacelle according to claim 7, wherein the height of the deformable bushing is inversely proportional to the distance separating the second fastening element from a wing of the angle profile locating against the first annular flange.

9. The nacelle according to claim 1, wherein the angle profile is connected to the adjacent cylindrical portion through the intermediary of two second fastening elements arranged in symmetric manner relative to the first fastening element.

* * * * *